United States Patent
Siden et al.

(10) Patent No.: US 8,146,341 B2
(45) Date of Patent: Apr. 3, 2012

(54) INTEGRATED GAS TURBINE EXHAUST DIFFUSER AND HEAT RECOVERY STEAM GENERATION SYSTEM

(75) Inventors: Gunnar Leif Siden, Greenville, SC (US); Jonathan Glenn Luedke, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 815 days.

(21) Appl. No.: 12/235,152

(22) Filed: Sep. 22, 2008

(65) Prior Publication Data
US 2010/0071342 A1    Mar. 25, 2010

(51) Int. Cl.
*F02C 6/00* (2006.01)
*F02G 1/00* (2006.01)

(52) U.S. Cl. .......... 60/39.182; 60/39.5; 60/806; 60/751; 415/191; 122/7 R (58) Field of Classification Search ............... 60/39.182, 60/39.5, 806, 751, 805, 801; 122/7 R, 7 B; 415/211.2, 191
See application file for complete search history.

(56) References Cited

U.S. PATENT DOCUMENTS

| | | | | |
|---|---|---|---|---|
| 3,895,243 A * | 7/1975 | Amend et al. | ................... | 310/11 |
| 4,466,241 A * | 8/1984 | Inui et al. | ................... | 60/39.182 |
| 4,507,914 A * | 4/1985 | Rice | ............... | 60/39.17 |
| 4,571,935 A * | 2/1986 | Rice | ................ | 60/775 |
| 5,282,355 A * | 2/1994 | Yamaguchi | .................... | 60/39.5 |
| 5,431,009 A * | 7/1995 | Bauver, II | ............... | 60/39.182 |
| 5,461,853 A * | 10/1995 | Vetterick | .......................... | 60/783 |
| 5,555,718 A * | 9/1996 | Anderson et al. | ............... | 60/783 |
| 5,603,604 A * | 2/1997 | Norris et al. | ............... | 415/208.1 |
| 5,603,605 A * | 2/1997 | Fonda-Bonardi | ........... | 415/211.2 |
| 5,642,614 A * | 7/1997 | Bozzuto et al. | ............. | 60/39.182 |
| 5,722,241 A * | 3/1998 | Huber | ............... | 60/728 |
| 5,784,888 A * | 7/1998 | Termuehlen | .................... | 60/677 |
| 5,791,136 A * | 8/1998 | Utamura et al. | ........... | 60/39.182 |
| 5,946,901 A * | 9/1999 | Bauver et al. | ............... | 60/39.182 |
| 6,050,084 A * | 4/2000 | Schutz et al. | ................... | 60/39.5 |
| 6,055,803 A * | 5/2000 | Mastronarde | .................... | 60/783 |
| 6,178,734 B1 * | 1/2001 | Shibuya et al. | .................. | 60/772 |
| 6,293,088 B1 * | 9/2001 | Moore et al. | .................... | 60/39.3 |
| 6,298,655 B1 * | 10/2001 | Lee et al. | .................... | 60/39.182 |
| 6,301,874 B1 * | 10/2001 | Wakazono et al. | ........ | 60/39.182 |
| 6,334,295 B1 * | 1/2002 | Eldrid et al. | .................... | 60/783 |
| 6,338,241 B1 * | 1/2002 | Shibuya et al. | ............. | 60/39.182 |

(Continued)

OTHER PUBLICATIONS

Chase et al.; "GE Combined-Cycle Product Line and Performance," GER-3574G Bulletin, Oct. 2000.

(Continued)

*Primary Examiner* — William H Rodriguez
(74) *Attorney, Agent, or Firm* — Fletcher Yoder PC (57) ABSTRACT

Systems and methods for integrating heat exchanger elements of HRSG systems with gas turbine exhaust diffusers are provided in the disclosed embodiments. The systems and methods may include integrating heat exchanger elements, such as steam pipes, with various components of an exhaust diffuser. For example, the heat exchanger elements may be integrated with inlet turning vanes, exhaust frame struts, exit guide vanes, associated support structures, and other components of the exhaust diffuser. In addition, the heat exchanger elements may be integrated with multiple components of a single exhaust diffuser. Moreover, the heat exchanger elements may be integrated with the components of the exhaust diffuser within an airfoil, which may encompass both the heat exchanger elements and the individual component of the exhaust diffuser. The use of airfoils may help ensure certain aerodynamic properties of the heated exhaust gas flowing across the exhaust diffuser components.

17 Claims, 6 Drawing Sheets

U.S. PATENT DOCUMENTS 6,896,475 B2   5/2005   Graziosi et al.
6,978,623 B2 * 12/2005  Hyakutake et al. ............. 60/806
7,100,356 B2 *  9/2006  Han et al. ................... 60/39.182
7,980,055 B2 *  7/2011  Lindenfeld ................... 60/39.5

OTHER PUBLICATIONS

Eldrid, et al.; "The 7FB: The Next Evolution of the F Gas Turbine," GER-4194 Bulletin, Apr. 2001.

* cited by examiner

INTEGRATED GAS TURBINE EXHAUST DIFFUSER AND HEAT RECOVERY STEAM GENERATION SYSTEM

BACKGROUND OF THE INVENTION

The present invention relates generally to gas turbine exhaust diffusers. More specifically, the invention relates to systems and methods for integrating heat exchanger elements, normally present in heat recovery steam generation (HRSG) systems, with components of gas turbine exhaust diffusers.

In combined cycle power generation systems, heated exhaust gas discharged from gas turbines may be used by HRSG systems as a source of heat, which may be transferred to a water source to generate superheated steam. In turn, the superheated steam may be used within steam turbines as a source of power. The heated exhaust gas may be delivered to the HRSG system through, among other things, an exhaust diffuser, which may help convert the kinetic energy of the heated exhaust gas exiting the gas turbine into potential energy in the form of increased static pressure. Once delivered to the HRSG system, the heated exhaust gas may traverse a series of heat exchanger elements, such as superheaters, re-heaters, evaporators, economizers, and so forth. The heat exchanger elements may be used to transfer heat from the heated exhaust gas to the water source to generate superheated steam. Both the exhaust diffuser and the HRSG may occupy a great deal of space within the combined cycle power generation plant. For instance, the exhaust diffuser, in many instances, may be as long as the gas turbine itself. In addition, the length of the HRSG may also be on the same order of magnitude. Therefore, it may prove beneficial to implement design strategies for reducing the overall footprint used by these two major components of the combined cycle power generation plant.

BRIEF DESCRIPTION OF THE INVENTION

In one embodiment, a system is provided. The system includes a heat recovery steam generation system. The system also includes a gas turbine exhaust diffuser having a plurality of heat exchanger elements of the heat recovery steam generation system integrated into an exhaust path of the gas turbine exhaust diffuser.

In another embodiment, a system is provided. The system includes a gas turbine exhaust diffuser. The gas turbine exhaust diffuser includes a heat exchanger element of a heat recovery steam generation system.

In yet another embodiment, a method of generating superheated steam is provided. The method includes discharging heated exhaust gas from a gas turbine. The method also includes directing the heated exhaust gas through an exhaust path of the gas turbine. The method further includes transferring heat from the heated exhaust gas to a water source to generate superheated steam. The heat transfer is performed using a heat exchanger element integrated with a component in the exhaust path of the gas turbine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

In certain embodiments, the systems and methods described herein include integrating heat exchanger elements with various components of a gas turbine exhaust diffuser. In various embodiments, the heat exchanger elements may be integrated with inlet turning vanes, exhaust frame struts, exit guide vanes, associated support structures, and other components of the exhaust diffuser. In addition, in certain embodiments, the heat exchanger elements may be integrated with multiple components of a single exhaust diffuser. Moreover, in certain embodiments, the heat exchanger elements may be integrated with the exhaust diffuser components within an airfoil, which may encompass both the heat exchanger elements and the associated component of the exhaust diffuser. The use of airfoils may help ensure certain aerodynamic properties of the heated exhaust gas flowing across the exhaust diffuser components.

Figure 1:
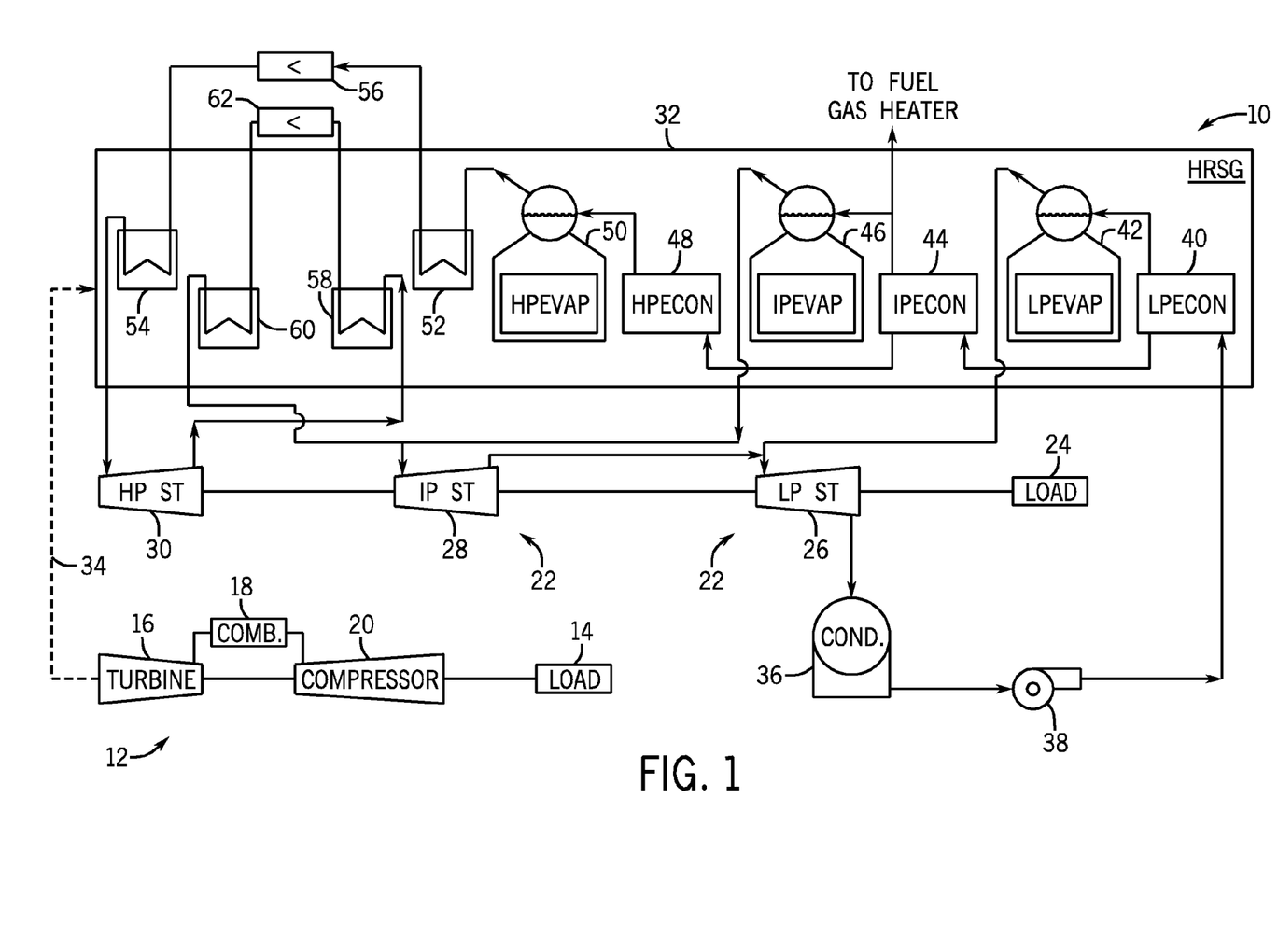
FIG. 1 is a schematic flow diagram of an embodiment of a combined cycle power generation system having a gas turbine, a steam turbine, and an HRSG.

FIG. 1 is a schematic flow diagram of an embodiment of a combined cycle power generation system 10 having a gas turbine, a steam turbine, and an HRSG. The system 10 may include a gas turbine 12 for driving a first load 14. The first load 14 may, for instance, be an electrical generator for producing electrical power. The gas turbine 12 may include a turbine 16, a combustor or combustion chamber 18, and a compressor 20. The system 10 may also include a steam turbine 22 for driving a second load 24. The second load 24 may also be an electrical generator for generating electrical power. However, both the first and second loads 14, 24 may be other types of loads capable of being driven by the gas turbine 12 and steam turbine 22. In addition, although the gas turbine 12 and steam turbine 22 may drive separate loads 14 and 24, as shown in the illustrated embodiment, the gas turbine 12 and steam turbine 22 may also be utilized in tandem to drive a single load via a single shaft. In the illustrated embodiment, the steam turbine 22 may include one low-pressure section 26 (LP ST), one intermediate-pressure section 28 (IP ST), and one high-pressure section 30 (HP ST). However, the specific configuration of the steam turbine 22, as well as the gas turbine 12, may be implementation-specific and may include any combination of sections.

The system 10 may also include a multi-stage HRSG 32. The components of the HRSG 32 in the illustrated embodiment are a simplified depiction of the HRSG 32 and are not intended to be limiting. Rather, the illustrated HRSG 32 is shown to convey the general operation of such HRSG systems. Heated exhaust gas 34 from the gas turbine 12 may be transported into the HRSG 32 and used to heat steam used to power the steam turbine 22. Exhaust from the low-pressure section 26 of the steam turbine 22 may be directed into a condenser 36. Condensate from the condenser 36 may, in turn, be directed into a low-pressure section of the HRSG 32 with the aid of a condensate pump 38.

The condensate may then flow through a low-pressure economizer 40 (LPECON), which is a device configured to heat feedwater with gases, may be used to heat the condensate. From the low-pressure economizer 40, the condensate may either be directed into a low-pressure evaporator 42 (LPEVAP) or toward an intermediate-pressure economizer 44 (IPECON). Steam from the low-pressure evaporator 42 may be returned to the low-pressure section 26 of the steam turbine 22. Likewise, from the intermediate-pressure economizer 44, the condensate may either be directed into an intermediate-pressure evaporator 46 (IPEVAP) or toward a high-pressure economizer 48 (HPECON). In addition, steam from the intermediate-pressure economizer 44 may be sent to a fuel gas heater (not shown) where the steam may be used to heat fuel gas for use in the combustion chamber 18 of the gas turbine 12. Steam from the intermediate-pressure evaporator 46 may be sent to the intermediate-pressure section 28 of the steam turbine 22. Again, the connections between the economizers, evaporators, and the steam turbine 22 may vary across implementations as the illustrated embodiment is merely illustrative of the general operation of an HRSG system that may employ unique aspects of the present embodiments.

Finally, condensate from the high-pressure economizer 48 may be directed into a high-pressure evaporator 50 (HPEVAP). Steam exiting the high-pressure evaporator 50 may be directed into a primary high-pressure superheater 52 and a finishing high-pressure superheater 54, where the steam is superheated and eventually sent to the high-pressure section 30 of the steam turbine 22. Exhaust from the high-pressure section 30 of the steam turbine 22 may, in turn, be directed into the intermediate-pressure section 28 of the steam turbine 22, and exhaust from the intermediate-pressure section 28 of the steam turbine 22 may be directed into the low-pressure section 26 of the steam turbine 22.

An inter-stage attemperator 56 may be located in between the primary high-pressure superheater 52 and the finishing high-pressure superheater 54. The inter-stage attemperator 56 may allow for more robust control of the exhaust temperature of steam from the finishing high-pressure superheater 54. Specifically, the inter-stage attemperator 56 may be configured to control the temperature of steam exiting the finishing high-pressure superheater 54 by injecting cooler feedwater spray into the superheated steam upstream of the finishing high-pressure superheater 54 whenever the exhaust temperature of the steam exiting the finishing high-pressure superheater 54 exceeds a predetermined value.

In addition, exhaust from the high-pressure section 30 of the steam turbine 22 may be directed into a primary re-heater 58 and a secondary re-heater 60 where it may be re-heated before being directed into the intermediate-pressure section 28 of the steam turbine 22. The primary re-heater 58 and secondary re-heater 60 may also be associated with an inter-stage attemperator 62 for controlling the exhaust steam temperature from the re-heaters. Specifically, the inter-stage attemperator 62 may be configured to control the temperature of steam exiting the secondary re-heater 60 by injecting cooler feedwater spray into the superheated steam upstream of the secondary re-heater 60 whenever the exhaust temperature of the steam exiting the secondary re-heater 60 exceeds a predetermined value.

In combined cycle systems such as system 10, hot exhaust may flow from the gas turbine 12 and pass through the HRSG 32 and may be used to generate high-pressure, high-temperature steam. The steam produced by the HRSG 32 may then be passed through the steam turbine 22 for power generation. In addition, the produced steam may also be supplied to any other processes where superheated steam may be used. The gas turbine 12 generation cycle is often referred to as the "topping cycle," whereas the steam turbine 22 generation cycle is often referred to as the "bottoming cycle." By combining these two cycles as illustrated in FIG. 1, the combined cycle power generation system 10 may lead to greater efficiencies in both cycles. In particular, exhaust heat from the topping cycle may be captured and used to generate steam for use in the bottoming cycle.

Therefore, one aspect of the combined cycle power generation system 10 is the ability to recapture heat from the heated exhaust gas 34 using the HRSG 32. As illustrated in FIG. 1, components of the gas turbine 12 and the HRSG 32 may be separated into discrete functional units. In other words, the gas turbine 12 may generate the heated exhaust gas 34 and direct the heated exhaust gas 34 toward the HRSG 32, which may be primarily responsible for recapturing the heat from the heated exhaust gas 34 by generating superheated steam. In turn, the superheated steam may be used by the steam turbine 22 as a source of power. The heated exhaust gas 34 may be transferred to the HRSG 32 through a series of ductwork, which may vary based on the particular design of the combined cycle power generation system 10.

Figure 2:
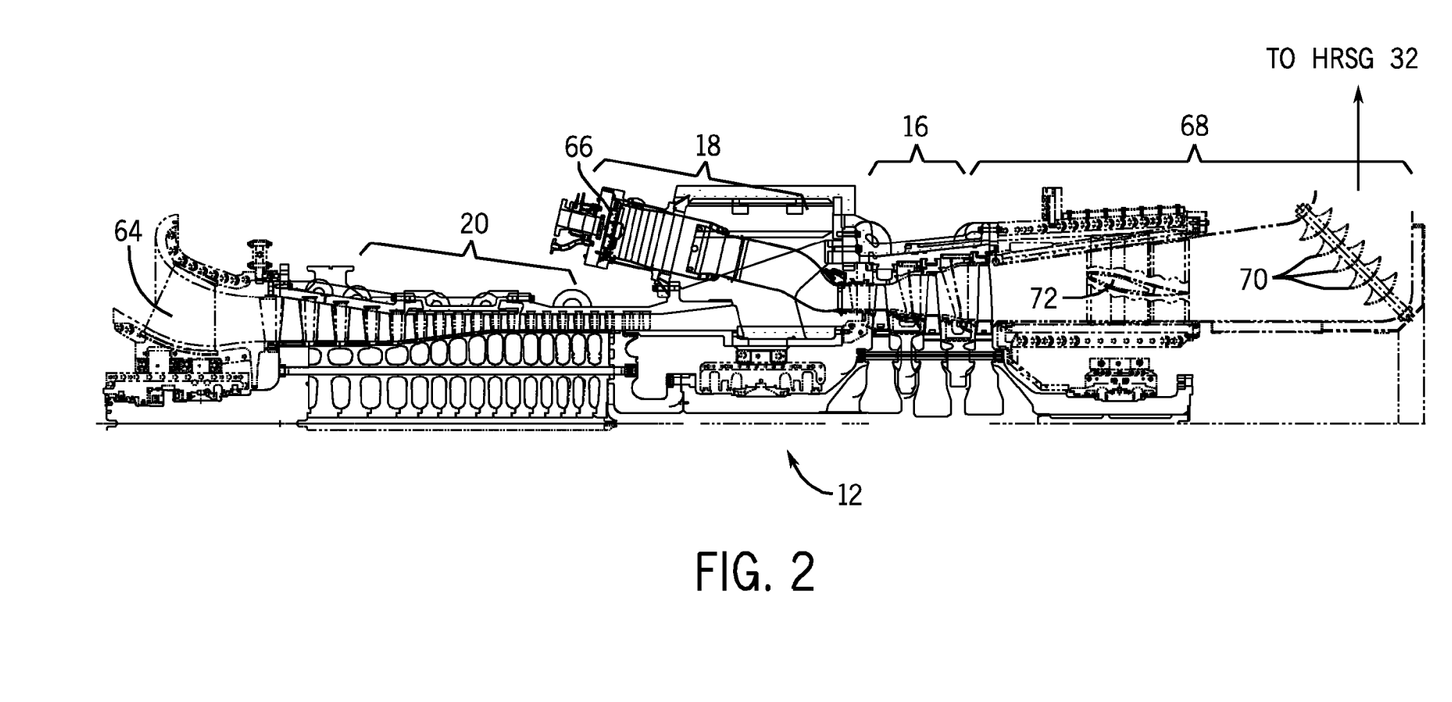
FIG. 2 is a detailed side view of an embodiment of the gas turbine of FIG. 1 having heat exchanger elements of the HRSG of FIG. 1 integrated with components of an exhaust diffuser of the gas turbine.

A more detailed illustration of how the gas turbine 12 functions may help illustrate how the heated exhaust gas 34 may be transferred to the HRSG 32 from the gas turbine 12. Accordingly, FIG. 2 is a detailed side view of an embodiment of the gas turbine 12 of FIG. 1 having heat exchanger elements of the HRSG 32 of FIG. 1 integrated with components of an exhaust diffuser of the gas turbine 12. As described with respect to FIG. 1, the gas turbine 12 may include the turbine 16, the combustion chamber 18, and the compressor 20. Air may enter through an air intake 64 and be compressed by the compressor 20. Next, the compressed air from the compressor 20 may be directed into the combustion chamber 18 where the compressed air may be mixed with fuel gas. The fuel gas may be injected into the combustion chamber 18 through a plurality of fuel nozzles 66. The mixture of compressed air and fuel gas is generally burned within the combustion chamber 18 to generate a high-temperature, high-pressure combustion gas, which may be used to generate torque within the turbine 16. A rotor of the turbine 16 may be coupled to a rotor of the compressor 20, such that rotation of the turbine 16 rotor may also cause rotation of the compressor 20 rotor. In this manner, the turbine 16 drives the compressor 20 as well as the load 14. Exhaust gas from the turbine 16 section of the gas turbine 12 may be directed into an exhaust diffuser 68. In the embodiment of FIG. 2, the exhaust diffuser 68 may be a radial exhaust diffuser, whereby the exhaust gas may be re-directed by exit guide vanes 70 to exit the exhaust diffuser 68 through a 90-degree turn outwardly (i.e., radially) through an exhaust plenum (not shown) toward the HRSG 32. In other embodiments, the exhaust diffuser 68 may be an axial exhaust diffuser, whereby the exhaust gas from the turbine 16 section may be directed toward the HRSG 32 axially (i.e., in a single, direct path without the 90-degree turn outward).

Another aspect of certain components of the exhaust diffuser 68, in addition to directing the heated exhaust gas 34 to the HRSG 32, may be to ensure that certain aerodynamic properties of the heated exhaust gas 34 are achieved. For instance, an exhaust frame strut 72, illustrated in FIG. 2, may be cambered with an airfoil wrapped around it. The exhaust frame strut 72 may also be rotated such that swirling of the heated exhaust gas 34 may be minimized and flow of the heated exhaust gas 34 may generally be more axial in nature until flowing through the exit guide vanes 70. In addition, the exit guide vanes 70 may also be designed in such a way that, when the heated exhaust gas 34 is turned toward the exhaust plenum at a 90-degree angle, the exit guide vanes 70 minimize the aerodynamic loss incurred in turning the flow 90 degrees radially. Therefore, proper aerodynamic design of the exhaust frame strut 72, exit guide vanes 70, as well as other components of the exhaust diffuser 68 within the flow path of the heated exhaust gas 34, may be a design consideration.

As shown in FIGS. 1 and 2, a considerable number of components may be used within the HRSG 32 and the exhaust diffuser 68. Moreover, these components may occupy a great deal of space within the combined cycle power generation system 10. The disclosed embodiments may help minimize the overall footprint of the HRSG 32. In particular, the disclosed embodiments combine functionalities of certain components of the HRSG 32 and the exhaust diffuser 68. For instance, many of the components of the HRSG 32 may, essentially, be heat exchanger elements (e.g., superheaters, re-heaters, evaporators, economizers, and so forth) capable of transferring heat from the heated exhaust gas 34 to a water source to create superheated steam. Thus, the disclosed embodiments help reduce the overall footprint of the HRSG 32 and the exhaust diffuser 68 at least partially by re-locating certain of these heat exchanger elements into portions of the exhaust diffuser 68, wherein the heat exchanger elements perform their heat exchange functions in a different unit (e.g., the exhaust diffuser 68 instead of the HRSG 32). Specifically, re-locating heat exchanger elements of the HRSG 32 within the exhaust diffuser 68 enables considerable size (e.g., length) reduction of the HRSG 32 without (or with little) size increase of the exhaust diffuser 68.

The integration of the HRSG 32 and the exhaust diffuser 68 may involve special design considerations. One reason for this is that HRSG systems, such as the HRSG 32, may often be manufactured and installed as stand-alone units including some of the heat exchanger elements suitable for re-location within the exhaust diffuser 68. Therefore, retrofitting existing exhaust diffusers 68 with heat exchanger elements of the HRSG 32 may prove somewhat problematic. However, the disclosed embodiments may enable both retrofitting of existing systems and manufacturing of complete packages with integrated features. Although retrofit kits are presently contemplated, the integration of the HRSG 32 heat exchanger elements within the exhaust diffuser 68 may, more commonly, involve designing, manufacturing, and installing the HRSG 32 and exhaust diffuser 68 as an integrated package. In certain embodiments, the HRSG 32 may be designed, manufactured, and installed as an integrated package with the gas turbine 12 being the main component.

Thus, a first integrated package may be a gas turbine 12, or some replaceable or retrofittable component (e.g., the exhaust diffuser 68), which includes integrated heat exchanger elements for use with the HRSG 32, the steam turbine 22, or some other system. The first integrated package may be sold alone or together with a second complementary package, such as the HRSG 32, the steam turbine 22, and so forth. The second package (e.g., HRSG 32) may be at least partially dependent on the first package, because some of the heat exchanger elements are integrated in the first package. However, in some embodiments, the second package may have optional heat exchanger elements, which can be modular/removable units to enable optional integration with the first package either at the time of purchase or at a future date.

Figure 3:
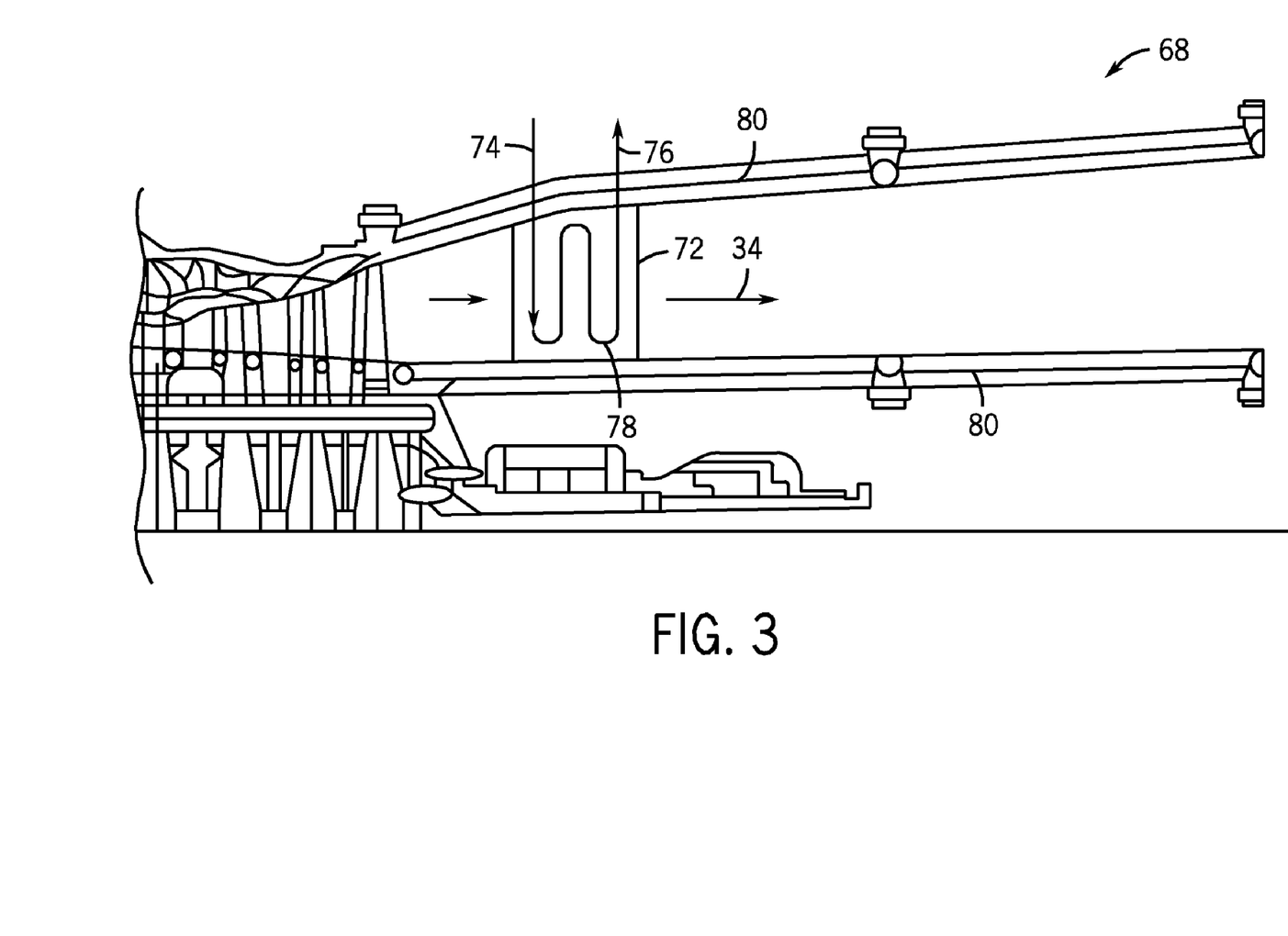
FIG. 3 is a detailed side view of an embodiment of the exhaust diffuser of FIG. 2 having heat exchanger elements of the HRSG of FIG. 1 integrated with its components.

FIG. 3 is a detailed side view of an embodiment of the exhaust diffuser 68 of FIG. 2 having heat exchanger elements of the HRSG 32 of FIG. 1 integrated with its components. Specifically, FIG. 3 illustrates an axial exhaust diffuser 68 wherein heat exchanger elements may be integrated with an exhaust frame strut 72 of the exhaust diffuser 68. Inlet steam pipes 74 may enter the exhaust frame strut 72 and outlet steam pipes 76 may exit the exhaust frame strut 72. Accordingly, steam may enter through the inlet steam pipes 74, flow through additional interior steam pipes 78, and exit through the outlet steam pipes 76. The steam flowing through the steam pipes 74, 76, 78 may be heated by the heated exhaust gas 34 flowing through the exhaust diffuser 68. Although the illustrated embodiment depicts the inlet and outlet steam pipes 74, 76 entering and exiting the exhaust frame strut 72 through a top portion of the exhaust diffuser 68, the inlet and outlet steam pipes 74, 76 may, in fact, be located at any convenient place within the exhaust diffuser 68. For instance, the inlet and outlet steam pipes 74, 76 may also be located underneath or on a side of the exhaust diffuser 68. However, regardless of the location of the inlet and outlet steam pipes 74, 76, the steam pipes 74, 76, 78 may be designed such that they do not adversely affect the functionality of the exhaust frame strut 72. In addition to functioning as support for an outer casing 80 of the exhaust diffuser 68, as described herein, the exhaust frame strut 72 may also help ensure that certain aerodynamic properties of the heated exhaust gas 34 are achieved.

Figure 4:
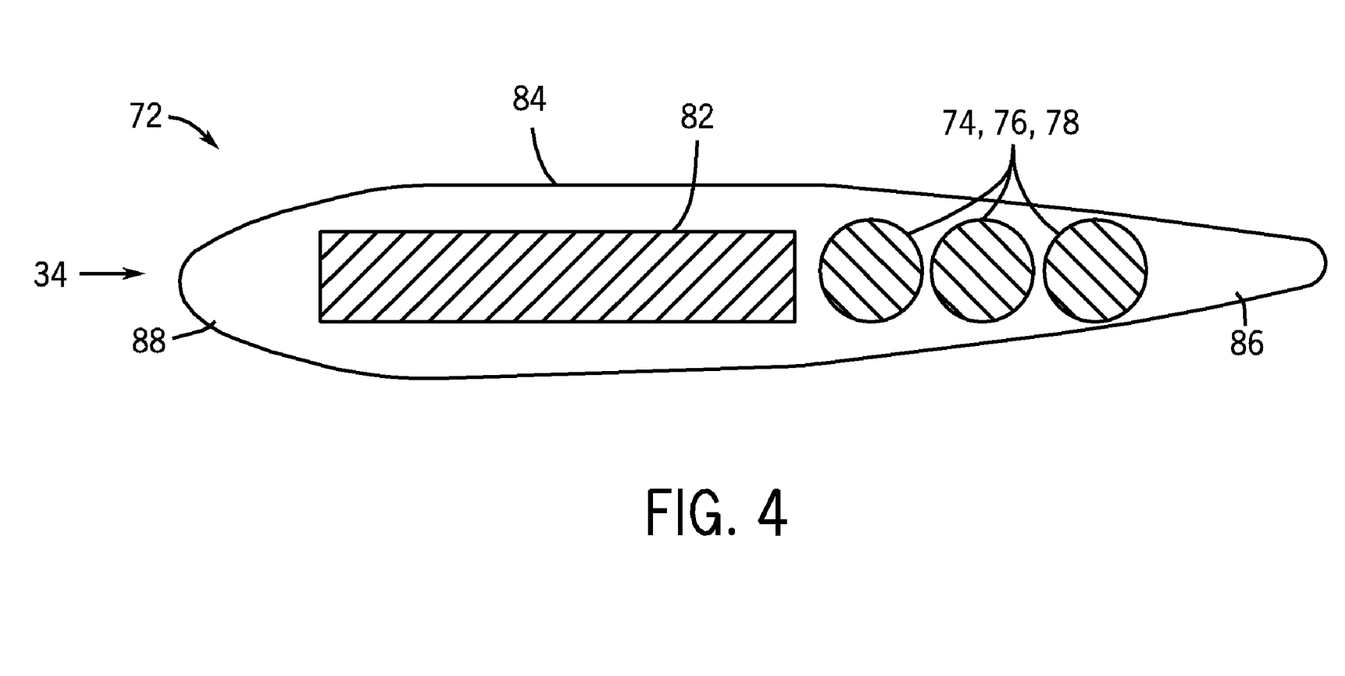
FIG. 4 is a sectional view of an embodiment of an exhaust frame strut, as may be used in the exhaust diffuser of FIG. 3, integrated with heat exchanger elements of the HRSG of FIG. 1.

FIG. 4 is a sectional view of an embodiment of an exhaust frame strut 72, as may be used in the exhaust diffuser 68 of FIG. 3, integrated with heat exchanger elements of the HRSG 32 of FIG. 1. A main strut portion 82 of the exhaust frame strut 72 may be encompassed by a strut airfoil 84. The strut airfoil 84 may add certain aerodynamic characteristics to improve or control the flow of the heated exhaust gas 34 through the exhaust diffuser 68. For instance, the strut airfoil 84 may help ensure that the heated exhaust gas 34 flows through the exhaust diffuser 68 axially.

However, in this embodiment, the steam pipes 74, 76, 78 described with respect to FIG. 3 may also be located within the strut airfoil 84. In the illustrated embodiment, the steam pipes 74, 76, 78 may be located within a tail portion 86 of the strut airfoil 84. However, in other embodiments, the steam pipes 74, 76, 78 may be located in other portions, such as in a front portion 88 of the strut airfoil 84 in order to maximize the heat transfer capabilities of the steam pipes 74, 76, 78 with respect to the heated exhaust gas 34 flowing over the strut airfoil 84. In addition, the particular embodiment illustrated, wherein the steam pipes 74, 76, 78 may be located within the strut airfoil 84, is merely illustrative and is not intended to be limiting. For instance, other designs may be used, such as locating the steam pipes 74, 76, 78 at other locations of the exhaust frame strut 72. In general, the illustrated embodiment serves at least three functions, including structural support, aerodynamics, and heat exchanging for an external system (e.g., HRSG 32). Thus, the embodiment of FIG. 4, as illustrated or in another suitable arrangements, enables adequate heat transfer between the steam pipes 74, 76, 78 and the heated exhaust gas 34 while also enabling the exhaust frame strut 72 to adequately perform its other functions (e.g., ensuring certain aerodynamic properties of the heated exhaust gas 34). However, the heat exchanger elements may be integrated with a variety of aerodynamic or non-aerodynamic components, structural or non-structural components, and so forth. Nevertheless, combining multiple functionalities may reduce costs, reduce space consumption, improve performance, and provide other benefits.

Figure 5:
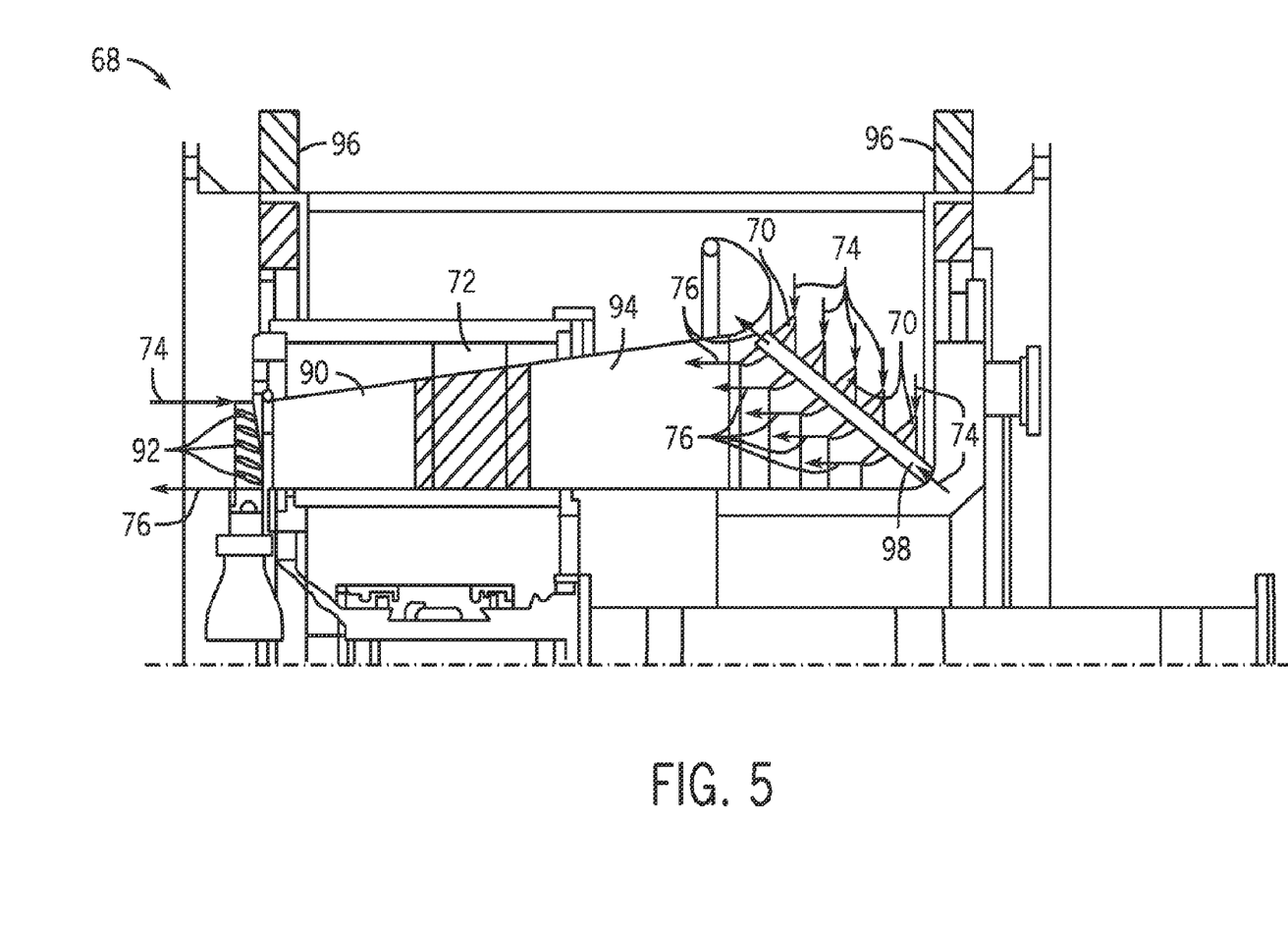
FIG. 5 is a detailed side view of an embodiment of an exhaust diffuser having multiple components with integrated heat exchanger elements of the HRSG of FIG. 1.

FIG. 5 is a detailed side view of an embodiment of an exhaust diffuser 68 having multiple components with integrated heat exchanger elements (e.g., the steam pipes 74, 76, 78 described above, or similar heat exchanger elements) of the HRSG 32 of FIG. 1. Specifically, FIG. 5 illustrates a radial exhaust diffuser 68 and several different components with integrated heat exchanger elements of the HRSG 32. For instance, the exhaust frame strut 72, described in greater detail in FIGS. 3 and 4, is shown.

In addition, before entering an upstream portion 90 of the exhaust diffuser 68, the heated exhaust gas 34 may pass through inlet turning vanes 92. These inlet turning vanes 92 may, for instance, be a series of vanes specifically configured to remove swirling within the heated exhaust gas 34, thereby increasing pressure recovery. This functionality is somewhat similar to that of the exhaust frame strut 72 described in FIG. 4. However, the inlet turning vanes 92 may be specifically designed for such aerodynamic functionality, whereas the exhaust frame strut 72 may be specifically designed for support functionality. Nevertheless, the disclosed embodiments may add aerodynamics and heat exchanger elements to the exhaust frame strut 72, such that the strut airfoil 84 can help reduce swirling and the steam pipes 74, 76, 78 can transfer heat. Likewise, the disclosed embodiments may add heat exchanger elements (e.g., the steam pipes 74, 76, 78 described above, or similar heat exchanger elements) to the inlet turning vanes 92, such that the inlet turning vanes 92 control flow, reduce swirl, and transfer heat via the steam pipes 74, 76, 78. The inlet turning vanes 92 may be characterized as having a larger vane count and thinner airfoil designs than the exhaust frame struts 72. Accordingly, in embodiments where heat exchanger elements of the HRSG 32 are integrated with the inlet turning vanes 92, the heat exchanger elements integrated within the inlet turning vanes 92 may be somewhat smaller and greater in number.

In addition, the exit guide vanes 70, described in FIG. 2 may also be used to integrate heat exchanger elements (e.g., the steam pipes 74, 76, 78 described above, or similar heat exchanger elements) from the HRSG 32. The heated exhaust gas 34 may be directed through the upstream portion 90 of the exhaust diffuser 68 and then through a downstream portion 94 of the exhaust diffuser 68. Downstream of an exit plane of the downstream portion 94 of the exhaust diffuser 68, the exit guide vanes 70 may be used to redirect the heated exhaust gas 34 in a 90-degree turn toward an exhaust plenum 96, which directs the heated exhaust gas 34 to the HRSG 32. The exit guide vanes 70 may be designed to control area expansion through the exhaust plenum 96 rather than allowing sudden expansion. Thus, the exit guide vanes 70 may improve pressure recovery. As shown, the exit guide vanes 70 may be somewhat larger than the inlet turning vanes 92. Therefore, in embodiments where heat exchanger elements of the HRSG 32 are integrated with the exit guide vanes 70, the heat exchanger elements used within the exit guide vanes 70 may, in turn, be somewhat larger than those used within the inlet turning vanes 92.

In addition, a support structure 98, such as support pipes, may be used to support the exit guide vanes 70 and may also be used to integrate heat exchanger elements of the HRSG 32 within the exhaust diffuser 68. More specifically, the heat exchanger elements (e.g., the steam pipes 74, 76, 78 described above, or similar heat exchanger elements) may be located within the support structure 98. Moreover, in certain embodiments, heat exchanger elements within both the support structure 98 and the exit guide vanes 70 may be used in conjunction with each other, since the support structure 98 may be in direct contact with the exit guide vanes 70. Therefore, in these embodiments, certain heat exchanger elements may extend through the support structure 98, into the exit guide vanes 70, and then back through the support structure 98.

In certain embodiments, heat exchanger elements of the HRSG 32 may be integrated with multiple components of a single exhaust diffuser 68. In other words, within a single exhaust diffuser 68, heat exchanger elements may be integrated with, for instance, one or more inlet turning vanes 92, one or more exhaust frame struts 72, one or more exit guide vanes 70, one or more support structures 98, or a combination thereof. The extent of integration of heat exchanger elements of the HRSG 32 with multiple components of the exhaust diffuser 68 may depend on the particular design conditions of both the exhaust diffuser 68 and the HRSG 32.

In addition, although the disclosed embodiments discussed herein illustrate the integration of heat exchanger elements of the HRSG 32 with inlet turning vanes 92, exhaust frame struts 72, exit guide vanes 70, and support structures 98, the disclosed embodiments may also be extended to other components of the exhaust diffuser 68. In fact, any component in an exhaust path of the exhaust diffuser 68 capable of integrating heat exchanger elements of the HRSG 32 may utilize the methods of the disclosed embodiments. For instance, heat exchanger elements of the HRSG 32 may also be integrated into the outer casings 80 of the exhaust diffuser 68 and designed in such a way that the integrated heat exchanger elements do not adversely affect (or, in fact, may improve) the flow of the heated exhaust gas 34 through the exhaust diffuser 68.

Although the disclosed embodiments described herein generally relate to the integration of heat exchanger elements of the HRSG 32 with components of a gas turbine exhaust diffuser 68, it should be noted that, in certain embodiments, the heat exchanger elements may be integrated with other components in an exhaust path of the gas turbine 12. For instance, heat exchanger elements of the HRSG 32 may also be integrated into components downstream of the turbine 16 section of the gas turbine 12 but upstream of the exhaust diffuser 68. In addition, the heat exchanger elements may be integrated into components downstream of the exhaust diffuser 68 but upstream of the HRSG 32. Moreover, the heat exchanger elements may, in fact, be integrated with components in an exhaust path of any type of engine which outputs a heated exhaust in the exhaust path of the engine.

Figure 6:
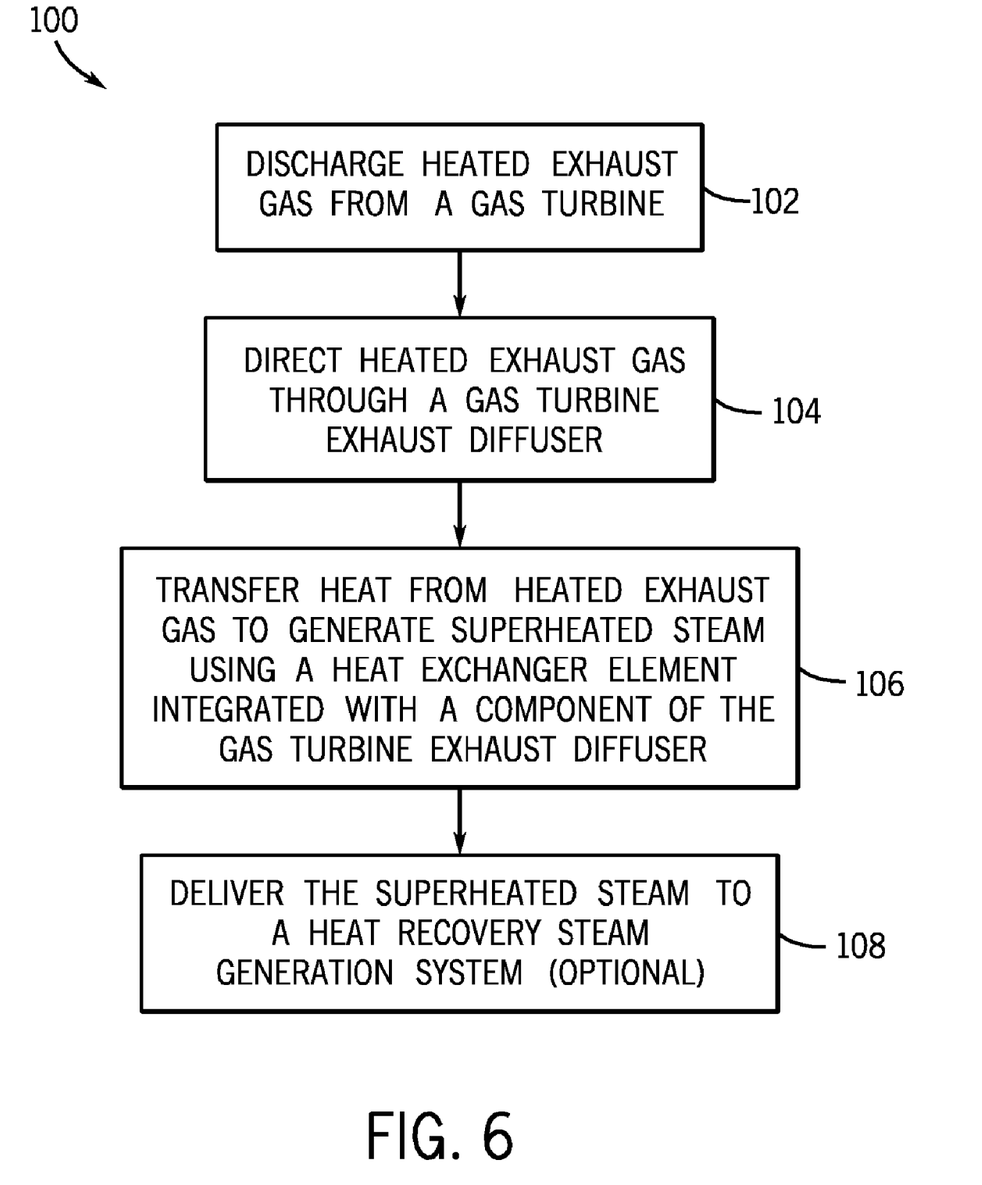
FIG. 6 is a flow chart of an embodiment of a method for generating superheated steam within the exhaust diffuser of FIGS. 2, 3, and 5.

Regardless of the particular configurations used (i.e., which combination of components are integrated with heat exchanger elements of the HRSG 32), the methods for generating superheated steam using the heat exchanger elements integrated with the components of the exhaust diffuser 68 may be substantially similar. In particular, FIG. 6 is a flow chart of an embodiment of a method 100 for generating superheated steam within the exhaust diffuser 68 of FIGS. 2, 3, and 5. At step 102, heated exhaust gas 34 may be discharged from the gas turbine 12. As discussed above, the heated exhaust gas 34 may provide the heat, which may be transferred to a water source to generate superheated steam. At step 104, the heated exhaust gas 34 may be directed through the exhaust diffuser 68 of the gas turbine 12. As discussed herein, several of the components of the exhaust diffuser 68 may provide flow control, such that the heated exhaust gas 34 is directed through the exhaust diffuser 68 with minimal loss.

At step 106, heat may be transferred from the heated exhaust gas 34 to a water source to generate superheated steam which may, for instance, be directed through the HRSG 32 for ultimate use by the steam turbine 22. As discussed herein with respect to the disclosed embodiments, the heat may be transferred from the heated exhaust gas 34 to the water source using heat exchanger elements integrated with components of the exhaust diffuser 68. These components may include the inlet turning vanes 92, the exhaust frame struts 72, the exit guide vanes 70, the support structures 98, as well as any other components of the exhaust diffuser 68 capable of being integrated with the heat exchanger elements.

Finally, at step 108, the generated superheated steam may be delivered to the HRSG 32, which uses the superheated steam as a power source. However, although the disclosed embodiments generally refer to scenarios where the superheated steam may be delivered to the steam turbine 22 through the HRSG 32, the superheated steam may also be delivered to any other processes within or external to the combined cycle power generation system 10 capable of using the superheated steam as a source of heat or power. For instance, the superheated steam may, among other things, be used to heat the fuel gas used within the combustion chamber 18 of the gas turbine 12. In other words, although the heat exchanger elements have been characterized as being part of the HRSG 32 in several of the embodiments disclosed herein, the heat exchanger elements may also be incorporated into other external steam generation processes.

Therefore, the disclosed embodiments enable the integration of heat exchanger elements of the HRSG 32 with various components of the exhaust diffuser 68, such as the inlet turning vanes 92, the exhaust frame struts 72, the exit guide vanes 70, the support structures 98, and so forth. The heat exchanger elements may be coupled with the components of the exhaust diffuser 68 in any manner which may enable the use of the heated exhaust gas 34 as a source of heat to be transferred to a water source in order to generate superheated steam. The heat exchanger elements may also be coupled with the components of the exhaust diffuser 68 in a manner that enables conversion of the kinetic energy of the heated exhaust gas 34 into potential energy in the form of increased static pressure. As discussed above, one advantage of the disclosed embodiments may be to reduce the overall length of the HRSG 32 by re-locating certain of the heat exchanger elements into the components of the exhaust diffuser 68.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
    a heat recovery steam generation system; and
    a gas turbine exhaust diffuser having a plurality of heat exchanger elements of the heat recovery steam generation system integrated into an exhaust path of the gas turbine exhaust diffuser, wherein the plurality of heat exchanger elements are integrated with an inlet turning vane disposed in the exhaust path of the gas turbine exhaust diffuser.

2. The system of claim 1, wherein the plurality of heat exchanger elements comprises steam pipes of a superheater, a re-heater, an evaporator, an economizer, or a combination thereof.

3. The system of claim 1, wherein heated exhaust gas discharged from a gas turbine flows through the exhaust path of the gas turbine exhaust diffuser, and the plurality of heat exchanger elements are configured to transfer heat from the heated exhaust gas to steam flowing through the plurality of heat exchanger elements.

4. The system of claim 1, comprising a steam turbine coupled to the heat recovery steam generation system.

5. The system of claim 1, comprising a gas turbine coupled to the gas turbine exhaust diffuser.

6. A system, comprising:
    a gas turbine exhaust diffuser, comprising a heat exchanger element of a heat recovery steam generation system, wherein the heat exchanger element is integrated with an exit guide vane disposed in an exhaust path of the gas turbine exhaust diffuser.

7. The system of claim 6, comprising an additional heat exchanger element integrated with an inlet turning vane disposed in the exhaust path of the gas turbine exhaust diffuser.

8. The system of claim 6, comprising an additional heat exchanger element integrated with an exhaust frame strut disposed in the exhaust path of the gas turbine exhaust diffuser.

9. The system of claim 6, comprising an additional heat exchanger element integrated with a support structure of the gas turbine exhaust diffuser, wherein the support structure is configured to support the exit guide vane disposed in the exhaust path of the gas turbine exhaust diffuser.

10. The system of claim 6, comprising an additional heat exchanger element integrated with a component of the gas turbine exhaust diffuser, wherein both the additional heat exchanger element and the component of the gas turbine exhaust diffuser are encompassed by an airfoil.

11. A method of generating superheated steam, comprising:
    discharging heated exhaust gas from a gas turbine;
    directing the heated exhaust gas through an exhaust path of the gas turbine; and
    transferring heat from the heated exhaust gas to a water source to generate superheated steam, wherein the heat transfer is performed using a heat exchanger element integrated with either an inlet turning vane or an exit guide vane of a gas turbine exhaust diffuser disposed in the exhaust path of the gas turbine.

12. The method of claim 11, comprising delivering the superheated steam to a heat recovery steam generation system.

13. The method of claim 11, wherein additional heat transfer is performed using an additional heat exchanger element integrated with an exhaust frame strut or support structure of the gas turbine exhaust diffuser disposed in the exhaust path of the gas turbine.

14. The method of claim 11, wherein the heat transfer is performed using a heat exchanger element re-located from a heat recovery steam generation system.

15. The method of claim 11, wherein the heat transfer is performed using a heat exchanger element retrofitted into the exhaust path of the gas turbine.

16. The method of claim 11, wherein the heat transfer is performed using a heat exchanger element integrated with the inlet turning vane of the gas turbine exhaust diffuser disposed in the exhaust path of the gas turbine.

17. The method of claim 11, wherein the heat transfer is performed using a heat exchanger element integrated with the exit guide vane of the gas turbine exhaust diffuser disposed in the exhaust path of the gas turbine.

* * * * *